United States Patent
Wei et al.

(10) Patent No.: US 12,491,820 B2
(45) Date of Patent: Dec. 9, 2025

(54) CAMERA MIRROR SYSTEM INCLUDING AUTOMATIC ANGULAR ADJUSTMENT FOR COMMERCIAL VEHICLE DISPLAYS

(71) Applicant: Stoneridge Electronics AB, Solna (SE)

(72) Inventors: Wenpeng Wei, Novi, MI (US); Liang Ma, Rochester, MI (US); Troy Otis Cooprider, White Lake, MI (US); Banuprakash Murthy, Novi, MI (US)

(73) Assignee: Stoneridge Electronics AB, Solna (SE)

(*) Notice: Subject to any disclaimer, the term of this patent is extended or adjusted under 35 U.S.C. 154(b) by 242 days.

(21) Appl. No.: 18/134,261

(22) Filed: Apr. 13, 2023

(65) Prior Publication Data

US 2023/0331163 A1    Oct. 19, 2023

Related U.S. Application Data

(60) Provisional application No. 63/330,460, filed on Apr. 13, 2022.

(51) Int. Cl.
*B60R 1/28*        (2022.01)
*G06T 7/73*        (2017.01)
(Continued)

(52) U.S. Cl.
CPC .................. *B60R 1/28* (2022.01); *G06T 7/73* (2017.01); *H04N 5/272* (2013.01);
(Continued)

(58) Field of Classification Search
CPC ............... B60R 1/28; B60R 2300/308; B60R 2300/8046; G06T 7/73; G06T 2207/30252; H04N 23/695; H04N 5/272
(Continued)

(56) References Cited

U.S. PATENT DOCUMENTS

2014/0200759 A1* 7/2014 Lu .............................. G06T 7/73
                                                                  701/28
2019/0139298 A1* 5/2019 Cho ...................... G06T 15/205
(Continued)

FOREIGN PATENT DOCUMENTS

EP      3138736       3/2017
EP      3219533       9/2017
(Continued)

OTHER PUBLICATIONS

International Preliminary Report on Patentability for International Patent Application No. PCT/US2023/018486 dated Oct. 24, 2024.
(Continued)

*Primary Examiner* — Edemio Navas, Jr.
*Assistant Examiner* — Jimmy S Lee
(74) *Attorney, Agent, or Firm* — Carlson, Gaskey & Olds, P.C.

(57) ABSTRACT

A method for adjusting a human machine interface (HMI) element location in a commercial vehicle display includes displaying, on an electronic display of a commercial vehicle, images from a camera secured to the commercial vehicle that depict a trailer of the commercial vehicle and its surrounding environment; determining a reference location of a reference point of the trailer in the images; superimposing an HMI element in the images on the electronic display at an HMI location determined relative to the reference location; and detecting that the reference location has changed in the images, and adjusting the HMI location in response thereto. A camera monitoring system (CMS) for a vehicle and a method for a camera mirror system are also disclosed.

10 Claims, 10 Drawing Sheets

(51) Int. Cl.
   *H04N 5/272*      (2006.01)
   *H04N 23/695*     (2023.01)
(52) U.S. Cl.
   CPC ...... *H04N 23/695* (2023.01); *B60R 2300/308* (2013.01); *B60R 2300/8046* (2013.01); *G06T 2207/30252* (2013.01)
(58) Field of Classification Search
   USPC .......................................................... 348/148
   See application file for complete search history.

(56) References Cited

U.S. PATENT DOCUMENTS

| | | | |
|---|---|---|---|
| 2020/0346581 A1* | 11/2020 | Lawson | ................ B60R 1/0612 |
| 2021/0114657 A1* | 4/2021 | Lu | ............................ B60D 1/62 |
| 2021/0214007 A1* | 7/2021 | Loos | ...................... G06V 20/56 |
| 2021/0394686 A1 | 12/2021 | Germaine et al. | |

FOREIGN PATENT DOCUMENTS

| | | |
|---|---|---|
| WO | 2010080610 | 7/2010 |
| WO | 2021155914 | 8/2021 |

OTHER PUBLICATIONS

International Search Report and Written Opinion for International Patent Application No. PCT/US2023/018486 dated Aug. 4, 2023.

* cited by examiner

CAMERA MIRROR SYSTEM INCLUDING AUTOMATIC ANGULAR ADJUSTMENT FOR COMMERCIAL VEHICLE DISPLAYS

CROSS-REFERENCE TO RELATED APPLICATIONS

This application claims the benefit of U.S. Provisional Application No. 63/330,460, filed Apr. 13, 2022, the disclosure of which is incorporated herein by reference in its entirety.

TECHNICAL FIELD

This disclosure relates to a camera monitor system (CMS) for use in a commercial vehicle that includes a trailer, and more particularly to a method for adjusting a location of a human machine interface (HMI) element within a commercial vehicle display.

BACKGROUND

Mirror replacement systems, and camera systems for supplementing mirror views, are utilized in commercial vehicles to enhance the ability of a vehicle operator to see a surrounding environment. Camera monitor systems (CMS) utilize one or more cameras to provide an enhanced field of view to a vehicle operator. In some examples, the mirror replacement systems cover a larger field of view than a conventional mirror, or include views that are not fully obtainable via a conventional mirror.

The CMS displays the mirror replacement and/or supplemental views to a vehicle operator using multiple displays positioned within the vehicle cab. In some cases, the displays include human machine interface (HMI) elements overlaid on top of the images. The HMI elements may provide relative position information, vehicle feature identification, and/or other information to the vehicle operator. The information supplements the views provided by the cameras and in some cases allows the CMS displays to provide better functionality than a conventional mirror system. The CMS conveys at least a portion of the supplemental information by positioning the HMI element in a defined location and/or orientation relative to an object within the image. However, when the camera image is angled or skewed relative to an expected position, the HMI elements may be overlaid in a location that differs from the desired position and/or in an orientation other than the desired orientation.

SUMMARY

A method for adjusting a human machine interface (HMI) element location in a commercial vehicle display according to an example embodiment of the present disclosure includes displaying, on an electronic display of a commercial vehicle, images from a camera secured to the commercial vehicle that depict a trailer of the commercial vehicle and its surrounding environment; determining a reference location of a reference point of the trailer in the images; superimposing an HMI element in the images on the electronic display at an HMI location determined relative to the reference location; and detecting that the reference location has changed in the images, and adjusting the HMI location in response thereto.

In a further embodiment of the foregoing embodiment, the HMI element is a distance marker that is superimposed to extend laterally away from a side of the trailer in the images.

In a further embodiment of any of the foregoing embodiments, adjusting the HMI location includes adjusting the HMI location to minimize or avoid overlap of the HMI element and the trailer in the images.

In a further embodiment of any of the foregoing embodiments, the reference point of the trailer is a rear corner of the trailer.

In a further embodiment of any of the foregoing embodiments, determining the reference location of the reference point of the trailer is based on a first trailer angle, which is an angle between a longitudinal axis of the trailer and a longitudinal axis of a tractor connected to the trailer; and a first arc representing a predefined range of possible locations of the reference point in the images.

In a further embodiment of any of the foregoing embodiments, the reference point of the trailer is a first reference point, and determining the reference location of the first reference point includes determining, based on the trailer angle, a trailer image angle which is an angle in one of the images defined relative to a trailer reference line in the images, the trailer reference line extending from a second reference point of the commercial vehicle towards a third reference point of the trailer. The second reference point is closer to a front of the trailer than the third reference point, and the third reference point is closer to the first reference point than the second reference point. Determining the reference location of the first reference point also includes determining the reference location of the first reference point based on the trailer image angle, an intersection of the trailer reference line and a second arc representing a predefined range of possible locations of the third reference point in the images, and a distance between the first arc and the second arc in the images.

In a further embodiment of any of the foregoing embodiments, the third reference point is located on a rear wheel of the trailer, the first reference point is located proximate to a front lower corner of the trailer, and the distance between the first arc and the second arc in the images is a vertical distance between the first arc and the second arc.

In a further embodiment of any of the foregoing embodiments, the camera is mounted to a camera arm that is configured to, during normal operation, rotate from a retracted position to an extended position at a predefined rotational speed, and the detecting includes measuring a rotational speed of the camera arm as it extends from a first position, that is intended to be the retracted position, to a second position, that is intended to be the extended position; and determining that the reference location has changed in the images based the measured rotational speed differing from the predefined rotational speed.

In a further embodiment of any of the foregoing embodiments, the camera is mounted to a camera arm that is configured to, during normal operation, rotate at a predefined angular speed from a retracted position to an extended position, such that it takes the camera arm a predefined time duration to extend from the retracted position to the extended position during normal operation, and the detecting includes measuring a time duration that it takes the camera arm to extend from a first position, that is intended to be the retracted position, to a second position, that is intended to be the extended position; and determining that the reference location has changed in the images based the measured time duration differing from the predefined time duration.

A camera monitoring system (CMS) for a vehicle according to an example embodiment of the present disclosure includes a camera configured to record images of a trailer of a commercial vehicle and its surrounding environment, an electronic display, and a CMS controller. The CMS controller is configured to display the images on the electronic display, determine a reference location of a reference point of the trailer in the images, superimpose a human machine interface (HMI) element in the images on the electronic display at an HMI location determined relative to the reference location, and detect that the reference location has changed in the images, and adjust the HMI location of the HMI element in response thereto.

In a further embodiment of the foregoing embodiment, the HMI element is a distance marker that is superimposed to extend laterally away from a side of the trailer in the images.

In a further embodiment of any of the foregoing embodiments, to adjust the HMI location of the HMI element on the electronic display, the CMS controller is configured to adjust the HMI location to minimize or avoid overlap of the HMI element and the trailer in the images.

In a further embodiment of any of the foregoing embodiments, the reference point of the trailer is a rear corner of the trailer.

In a further embodiment of any of the foregoing embodiments, the CMS controller is configured to determine the reference location of the reference point based on a first trailer angle, which is an angle between a longitudinal axis of the trailer and a longitudinal axis of a tractor connected to the trailer; and a first arc representing a predefined range of possible locations of the reference point in the images.

In a further embodiment of any of the foregoing embodiments, the reference point of the trailer is a first reference point, and to determine the reference location of the first reference point, the CMS controller is configured to determine, based on the trailer angle, a trailer image angle which is an angle in one of the images defined relative to a trailer reference line in the images, the trailer reference line extending from a second reference point of the commercial vehicle towards a third reference point of the trailer. The second reference point is closer to a front of the trailer than the third reference point, and the third reference point is closer to the first reference point than the second reference point. The CMS controller is also configured to determine the reference location of the first reference point based on the trailer image angle, an intersection of the trailer reference line and a second arc representing a predefined range of possible locations of the third reference point in the images, and a distance between the first arc and the second arc in the images.

In a further embodiment of any of the foregoing embodiments, the third reference point is located on a rear wheel of the trailer, the first reference point is located proximate to a front lower corner of the trailer, and the distance between the first arc and the second arc in the images is a vertical distance between the first arc and the second arc.

In a further embodiment of any of the foregoing embodiments, the camera is mounted to a camera arm that is configured to, during normal operation, rotate from a retracted position to an extended position at a predefined rotational speed. To detect that the reference location has changed in the images, the CMS controller is configured to measure a rotational speed of the camera arm as it extends from a first position, that is intended to be the retracted position, to a second position, that is intended to be the extended position; and determine that the reference location has changed in the images based the measured rotational speed differing from the predefined rotational speed.

In a further embodiment of any of the foregoing embodiments, the camera is mounted to a camera arm that is configured to, during normal operation, rotate at a predefined angular speed from a retracted position to an extended position, such that it takes the camera arm a predefined time duration to extend from the retracted position to the extended position during normal operation. To detect that the reference location has changed in the images, the CMS controller is configured to measure a time duration that it takes the camera arm to extend from a first position, that is intended to be the retracted position, to a second position, that is intended to be the extended position; and determine that the reference location has changed in the images based the measured time duration differing from the predefined time duration.

A method for a camera mirror system according to an example embodiment of the present disclosure includes initiating, for a camera arm, an extension process that is configured to, during normal operation, rotate the camera arm at a predefined rotational speed from a retracted position to an extended position, such that it takes the camera arm a predefined time duration to extend from the retracted position to the extended position during normal operation; measuring a rotational speed of the camera arm during the extension process or a time duration that it takes the camera arm to complete the extension process; and, based on the rotational speed or time duration differing from an expected value by more than a predefined threshold, determining that the camera arm has not reached the extended position and adjusting a location of a human machine interface (HMI) element within a vehicle display.

In a further embodiment of the foregoing embodiment, the measuring includes measuring both the rotational speed of the camera arm during the camera arm extension process and the time duration that it takes the camera arm to complete the extension process; and determining that the camera arm has not reached the extended position is based on either the measured rotational speed differing from the predefined expected rotational speed threshold by more than a predefined rotational speed threshold or the measured time duration differing from the a predefined expected time duration by more than a predefined time threshold.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The disclosure can be further understood by reference to the following detailed description when considered in connection with the accompanying drawings wherein.

DETAILED DESCRIPTION

A schematic view of a commercial vehicle 10 is illustrated in FIGS. 1A, 1B, 1C, and 1D. The vehicle 10 includes a vehicle cab or "tractor 12" for pulling a trailer 14. Although the vehicle 10 is depicted as a commercial truck in this disclosure, it is understood that other types of vehicles may be used, and it should be understood that other configurations may be utilized for the vehicle cab 12 and/or trailer 14.

Figure 1A:
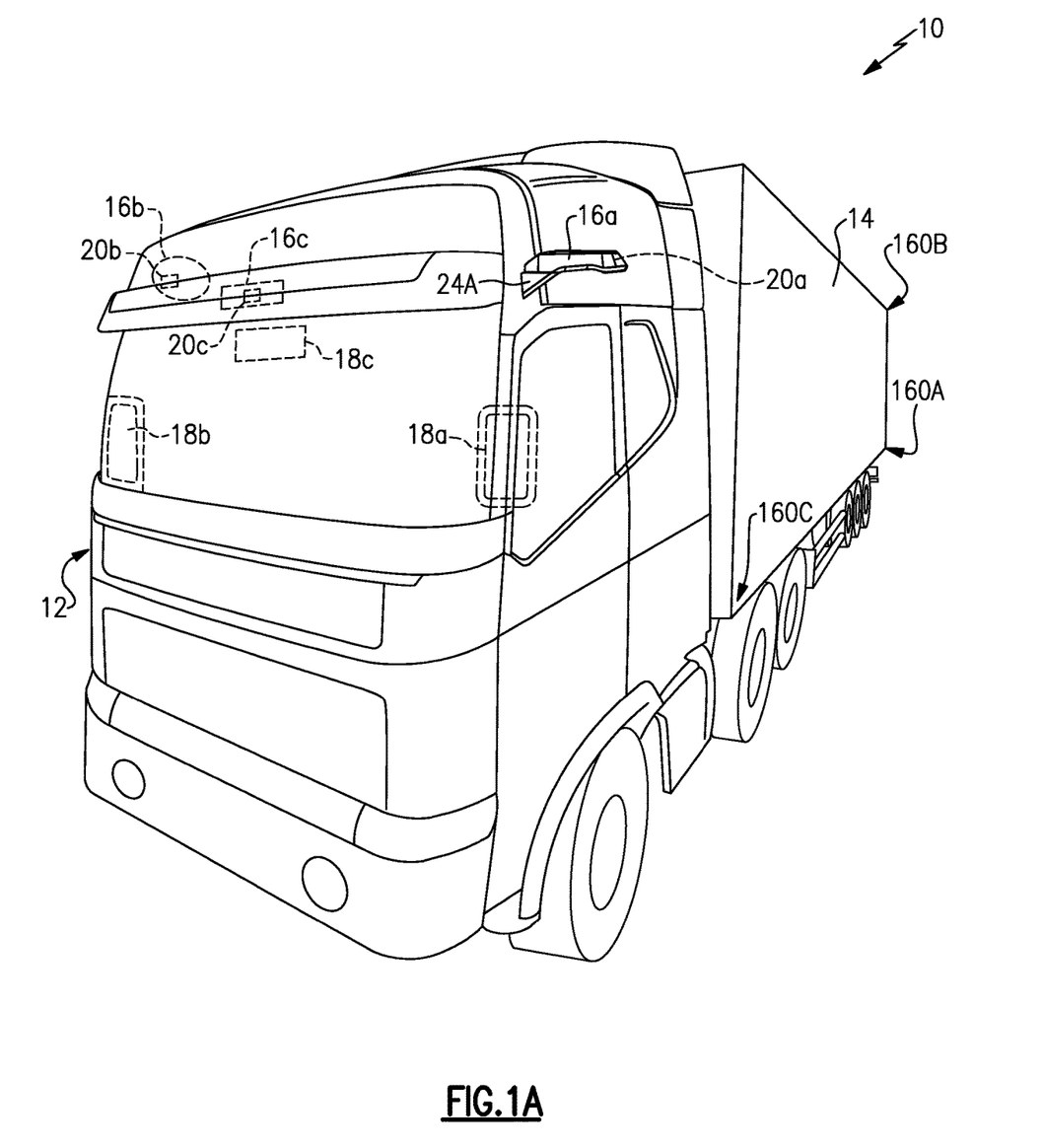
FIG. 1A is a schematic front view of a commercial truck with a camera mirror system (CMS) used to provide at least Class II and Class IV views.
Figure 1B:
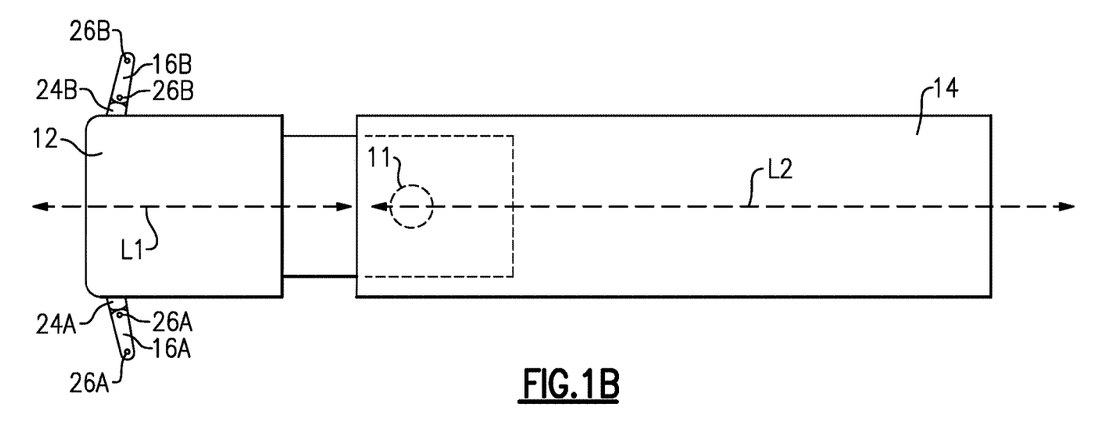
FIG. 1B is a schematic to elevational view of the commercial truck of FIG. 1 with a trailer angle of zero.
Figure 1C:
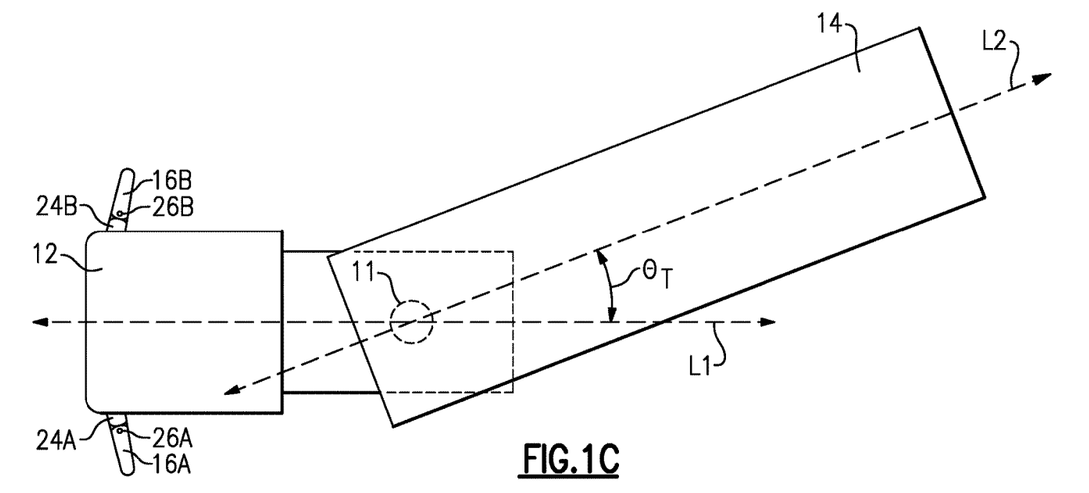
FIG. 1C is a schematic to elevational view of the commercial truck of FIG. 1 with a non-zero trailer angle.

As shown in FIG. 1B-1C, a hitch 11 mounts the trailer 14 to the tractor 12, and allows the trailer 14 to pivot with respect to the tractor 12 during turns. The tractor 12 has a central longitudinal axis L1, and the trailer 14 has a central longitudinal axis L2. As shown in FIG. 1B, when the tractor 12 is not turning, the axes L1, L2 are parallel or co-axial, and there is no angle between the axis L1, L2. As shown in FIG. 1C, when the tractor 12 is turning, an angle $\theta_T$ is formed between the axes L1, L2. The angle between the axes L1, L2, which is approximately 20° in FIG. 1C, will be referred to a "trailer angle" herein.

Figure 1D:
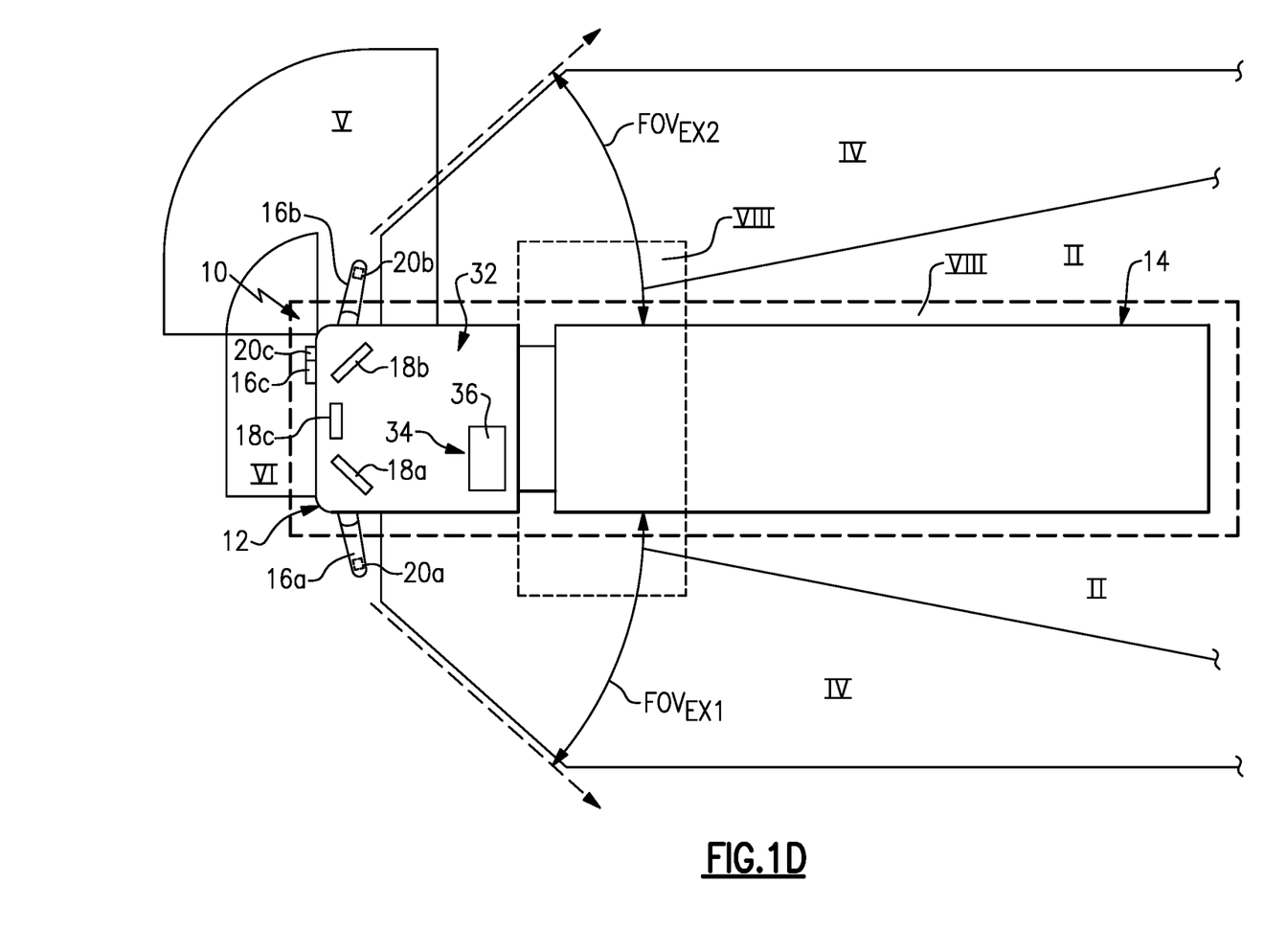
FIG. 1D is a schematic top elevational view of the commercial truck of FIG. 1 with a CMS providing Class II, Class IV, Class V and Class VI views.
Figure 2:
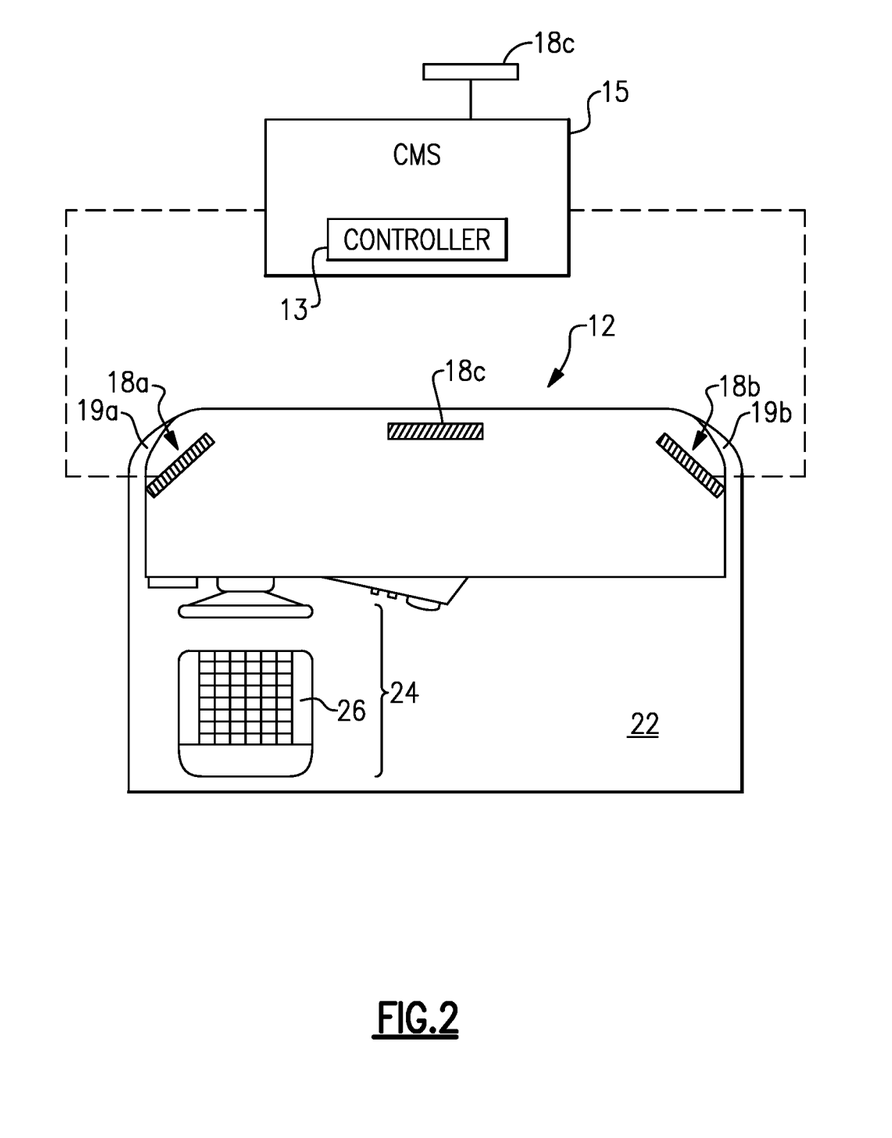
FIG. 2 is a schematic top perspective view of a vehicle cabin including displays and interior cameras.

Referring now to FIG. 2 with continued reference to FIGS. 1A and 1D, a camera mirror system (CMS) 15 includes driver and passenger side camera arms 16a, 16b mounted to the outside of the vehicle cab 12 (FIG. 1A). If desired, the camera arms 16a, 16b may include conventional mirrors integrated with them as well, although the CMS 15 may be used to entirely replace mirrors. In additional examples, each side can include multiple camera arms, each arm housing one or more cameras and/or mirrors. As shown in FIG. 2, the CMS 15 includes a CMS controller 13 that includes processing circuitry that supports operation of the CMS 15 and is operatively connected to memory. The processing circuitry may include one or more microprocessors, microcontrollers, application specific integrated circuits (ASICs), or the like.

Referring to FIG. 2, first and second electronic displays, which may be video displays, 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver.

If video of Class VIII views is desired, camera housings can be disposed at the sides and rear of the vehicle 10 to provide fields of view including some or all of the Class VIII zones of the vehicle 10. In such examples, the third display 18c can include one or more frames displaying the Class VIII views. Alternatively, additional displays can be added near the first, second and third displays 18a, 18b, 18c and provide a display dedicated to providing a Class VIII view. The displays 18a, 18b, 18c face a driver region 34 within the cabin 32 where an operator is seated on a driver seat 36.

Figure 3A:
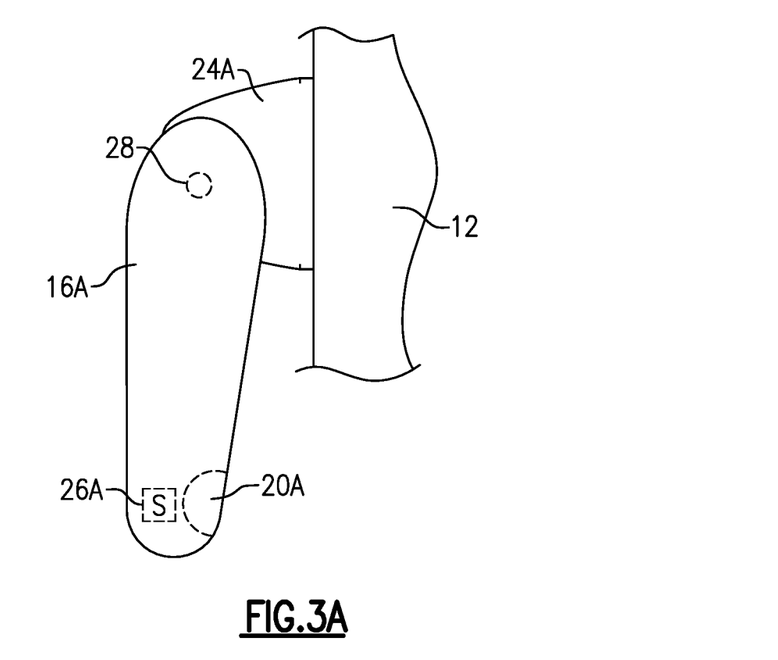
FIG. 3A schematically illustrates a simplified camera arm in a retracted position.
Figure 3B:
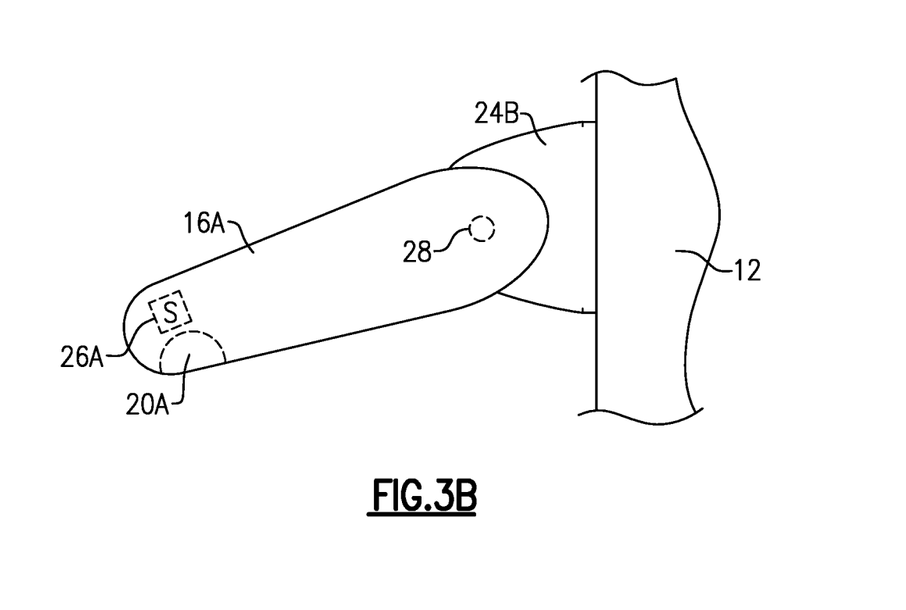
FIG. 3B schematically illustrates the simplified camera arm of FIG. 3A in an extended position.

With continued reference to FIGS. 1A and 1D and 2, FIG. 3A schematically illustrates an example of camera arm 16a in a retracted position, and FIG. 3B schematically illustrates the camera arm 16A in an extended position. Each camera arm 16A-B includes at least one rearward facing camera 20, and is mounted to a respective base 24A-B that is mounted to the tractor 12. Each camera 20 is connected to its respective base 24 through a respective linkage 28A-B (e.g., a ball joint), and the camera arms 16A-B are configured to rotate about their respective linkage 28A-B between their respective retracted position (shown for camera arm 16A in FIG. 3A) and extended position (shown for camera arm 16A in FIG. 3B). In particular, each camera arm 16 is configured to extend from the retracted position to the extended position through an extension process, and is configured to retract from the extended position to the retracted position through a retraction process.

During normal operation, each the camera arm 16 is configured to rotate at a predefined rotational speed during its extension process, such that it takes the camera arm 16 a predefined time duration to complete the extension process and extend from the retracted position to the extended position. Similarly, during normal operation, the camera arm 16 is configured to rotate at the same or another predefined rotational speed during the retraction process, such that it takes the camera arm the same or a different predefined time duration to complete the retraction process and retract from the extended position to the retracted position.

Each camera arm includes a respective angular motion sensor 26A-B configured to measure an angular speed of rotation at which the camera arms 16 rotate between the retracted and extended positions. In one example the angular motion sensor 22 is an inertial measurement unit (IMU). In another example the angular motion sensor 22 is an accelerometer. In yet other examples, the angular motion sensor 222 can be any sensor, or combination of sensors able to detect the relative motion, including angular motion, of the sensing unit. The CMS controller 13 is configured to utilize the angular motion sensors 26A-B to measure a rotational speed of the camera arms 16 during the extension and/or retraction process. It is appreciated that the camera arms 16A-B and linkages 26A-B are simplified for explanatory purposes, and that more complicated support structures including articulation arms, powered articulating joints, and similar implements can be utilized to achieve the positioning of the cameras 20a, 20b described herein.

With continued reference to the CMS 15 described in FIGS. 1-3, FIG. 4 illustrates an example Class II image 204 from camera 20a displayed to a vehicle operator (e.g., on electronic display 18a). The image 204 includes a trailer 210, trailer wheels 220, as well as a view of the road 230, and the surrounding environment. Overlaid on top of the image 204 are multiple human machine interface (HMI) elements, including distance lines 142 (projection of trailer end onto the ground), 144 (30 m from distance line 142), 146 (100 m from distance line 142). Also shown are wheel centers 150A-C of wheels 220, wheel centers 150, rear lower trailer corner 160A, rear upper trailer corner 160B and a rear edge 162. In alternative embodiments, alternative HMI elements such as a top of trailer end indicator, a reversing trajectory, etc. can be included in addition to, or in place of some or all of the HMI elements shown in FIG. 4, and the illustrated HMI elements and configurations are purely example in nature.

Figure 4:
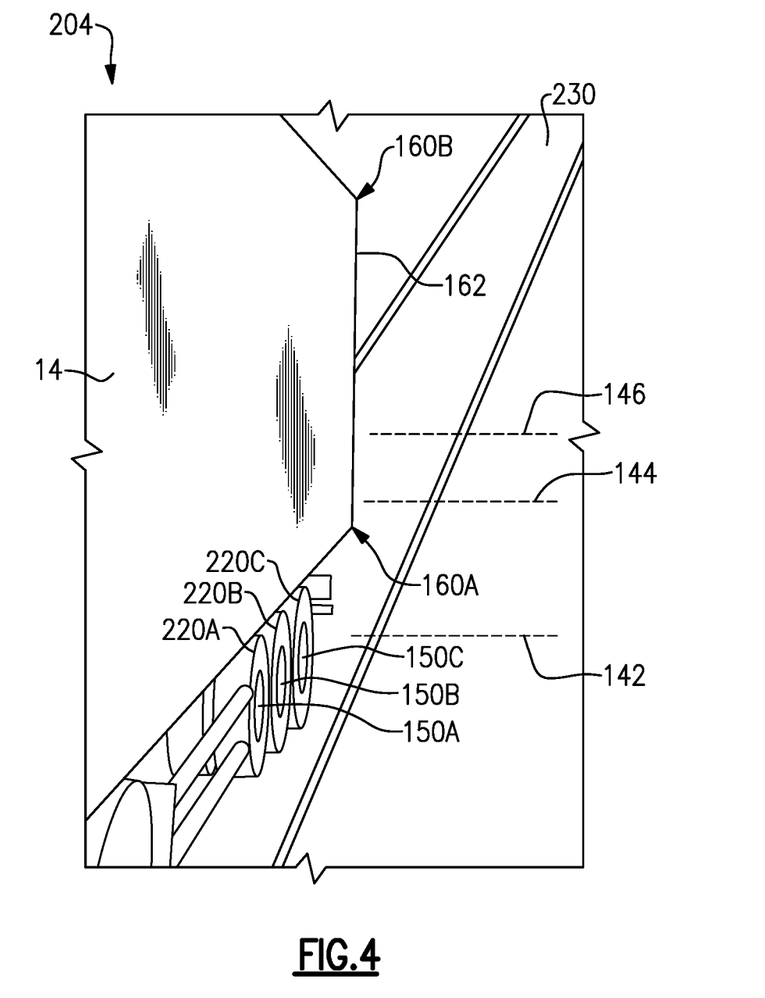
FIG. 4 schematically illustrates an example CMS display including multiple human machine interface (HMI) elements.

Each of the HMI elements are displayed at particular locations on in the image 204 that are determined relative to a reference location in the image 204, such as the rear lower trailer corner 160A or a rear upper trailer corner 106B.

The reference location in the image 204 may change for a variety of reasons, such as vehicle turning (forward or reverse), vehicle loading (which may cause the trailer to compress its tires more and thereby be closer to the ground than in an unloaded state), road grade changes (which may cause the camera 20 to angle either up or down relative to a level ground plane), impact of an external object (e.g., a tree branch) with the camera arms 16A-B, and similar events.

By way of example, If the camera 20 is angled downward, relative to gravity, with no orientation shift, the objects in the image appear to shift upward and will be located higher in the field of view. The opposite is true for a camera 20 angling upward. Similarly, if the camera 20 is rotated toward the vehicle 10, a skew can occur, with objects near the side of the vehicle 10 appearing larger than objects farther away from the side of the vehicle 10.

When the reference location (e.g., of corner 160A and/or 160B) is be shifted (e.g., due to one of the events discussed above), this causes a change in the image 204 presented to the operator on a corresponding display (e.g., displays 18A and/or 18B), potentially resulting in inaccurate placement of the HMI elements 142, 144, 146. For example, if a static location was maintained for the HMI elements 142, 144, 146, the elements may be overlaid onto the trailer 14 during turns. When the camera 20a, 20b is used for generating a Class II/Class IV image, the changes described above can apply to both the Class II and the Class IV fields of view.

Many of the HMI elements, including those illustrated in FIG. 4, communicate information to the operator regarding the vehicle 10 and/or the surrounding environment based at least in part on the relative positions of the HMI element and the portions of the vehicle 10 in view. By way of example, the distance lines 142, 144, 146 represent a distance from the rear edge 162 of the trailer 110, and the position of the line 142, 144, 146 relative to the end of the trailer 14. Further, the orientation of the line as it extends away from the end of the trailer 14 provides an indication as to what aspects in the image are at the distance of the distance line 142, 144, 146.

Movement of the reference location in the image (e.g., the trailer corner 160A) relative to the camera 20, whether through movement of the trailer 14 or unintended movement of the camera 20 (e.g., due to contact with a tree branch causing the camera arm 16 to not reach the expected extended position, but instead reach some other extended position), without adjustment of the HMI element locations, will cause the HMI elements to be placed in an incorrect location in CMS images. As will be discussed in greater detail below, the CMS controller 13 is configured to utilize software within the CMS 15 to detect when the reference location has changed in the images, and to adjust an HMI location in response thereto, such that the HMI elements within the image are moved to account for the shifted positions and to allow for continued accuracy of the information conveyed.

Figure 5:
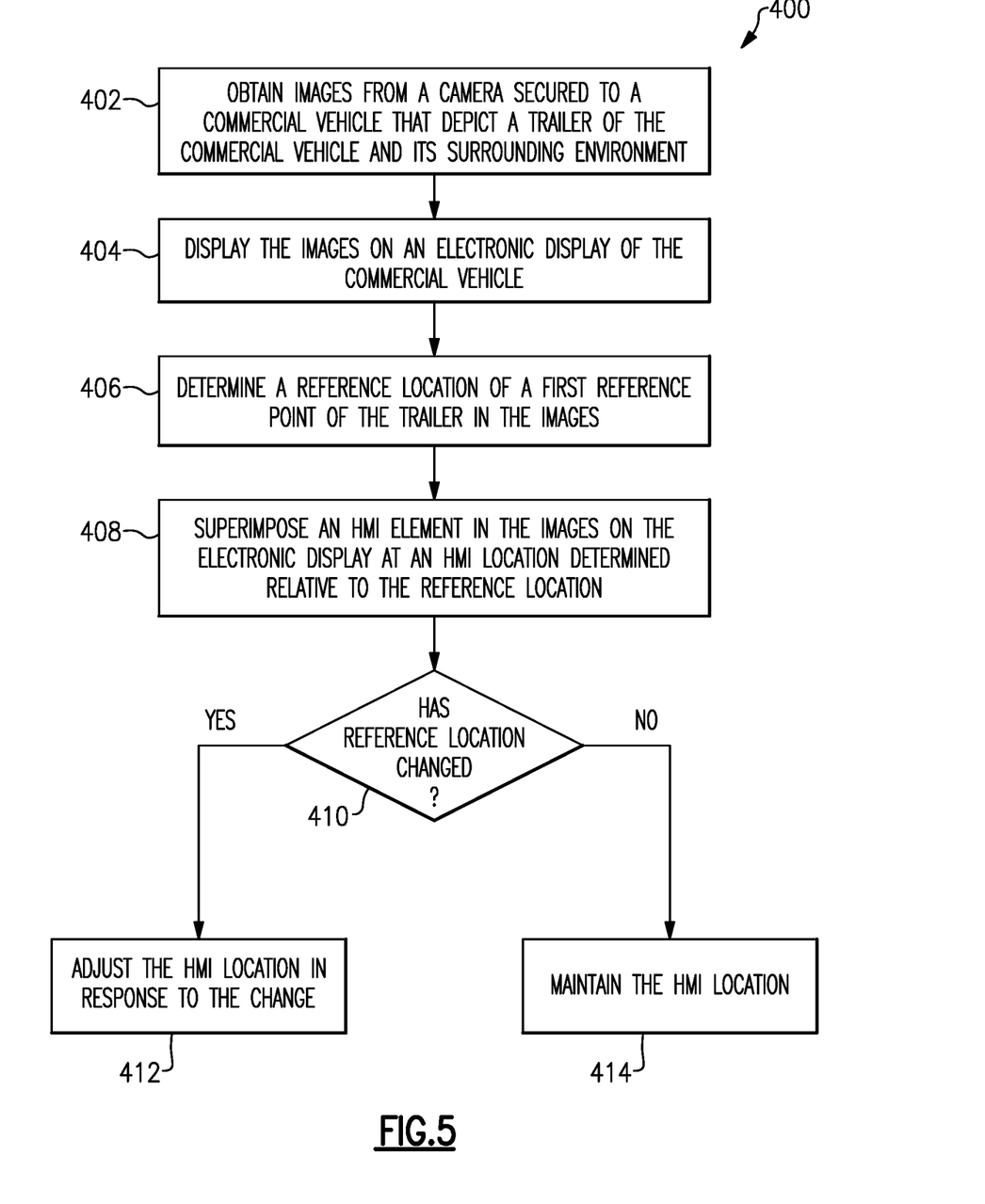
FIG. 5 schematically illustrates an example method for adjusting an HMI element.

FIG. 5 is a flowchart of an example method 400 for adjusting a HMI element location in a commercial vehicle electronic display 18. Images are obtained from a camera 20 that depict a trailer 14 of commercial vehicle 10 and its surrounding environment (step 402). The images are displayed on an electronic display 18 of the commercial vehicle 10 (step 404). A determination is made (e.g., by the CMS controller 13) of a reference location of a first reference point of the trailer 14 in the images (step 406). An HMI element 142, 144, 146 is superimposed in the images on the electronic display 18 at an HMI location determined relative to the reference location (step 408).

A determination is made (e.g., by the CMS controller 13) of whether the reference location has changed in the images (step 410). If the reference location has changed (a "yes" to step 410), the HMI location is adjusted in response to the change (step 412). Otherwise, if the reference location has not changed in the images (a "no" to step 410), the HMI location is maintained (step 414). In one example, the change must exceed a predefined threshold (e.g., a minimum pixel change) in order to trigger the adjustment in step 412. As discussed in greater detail below, the determination of whether the reference location has changed in 410 may be based on an image analysis and/or based on movement of the camera arm 16. Also, the method 400 may be performed for multiple HMI elements that each have their own respective HMI location determined relative to the reference location.

As discussed above, the HMI element may be a distance marker 142, 144, and/or 146 that is superimposed to extend laterally away from a side of the trailer 14 in the images (as represented by rear edge 162), and the reference point of the trailer 14 may be a rear corner 160A or 160B, for example. In one example, adjusting the HMI location in step 412 includes adjusting the HMI location horizontally and/or vertically to minimize or avoid overlap of the HMI element(s) and the trailer 14 in the images, and to instead overlap the HMI element(s) with a road or similar portion of the image.

Figure 6:
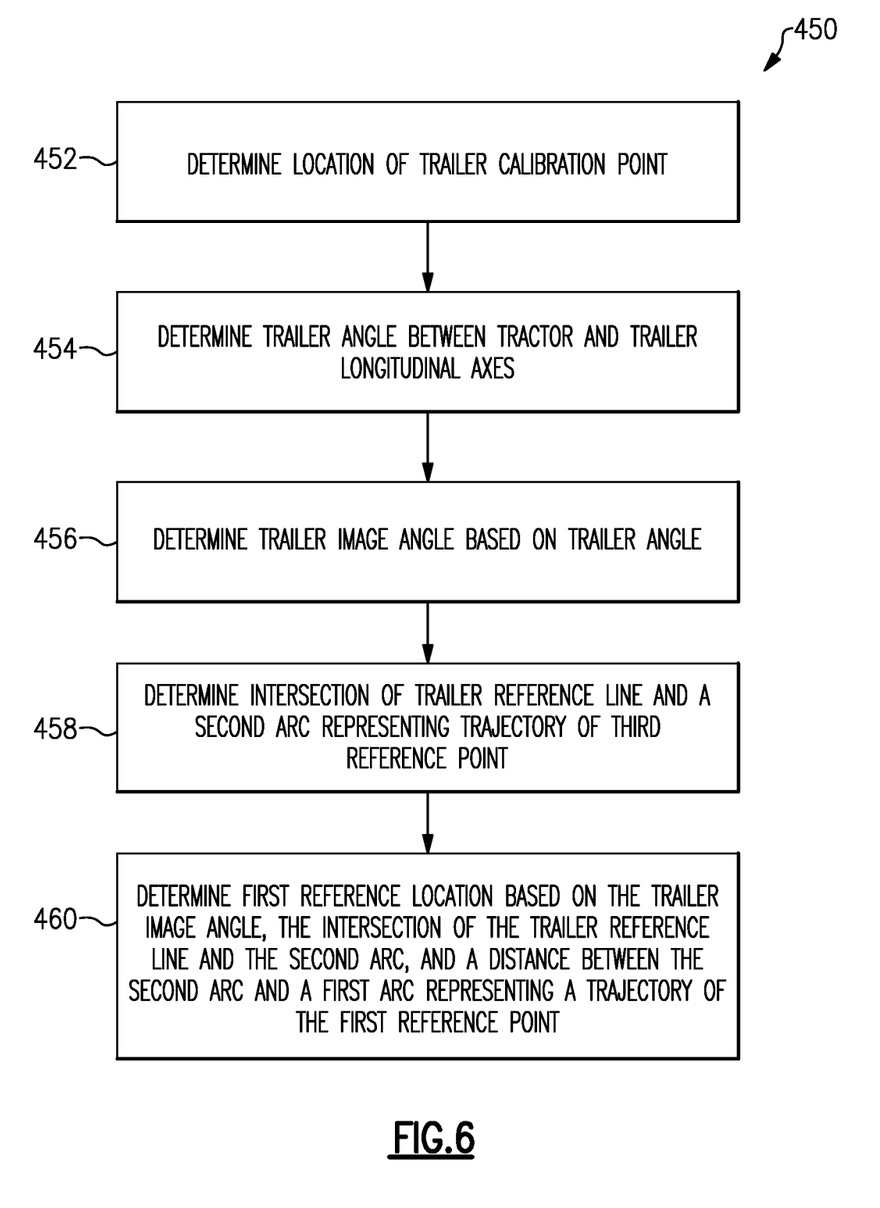
FIG. 6 schematically illustrates an example implementation of a step from the method of FIG. 5.

FIG. 6 illustrates an example implementation 450 of step 406 from FIG. 4, for determining a reference location of a reference point of the trailer 14 in CMS images.

Figure 7:
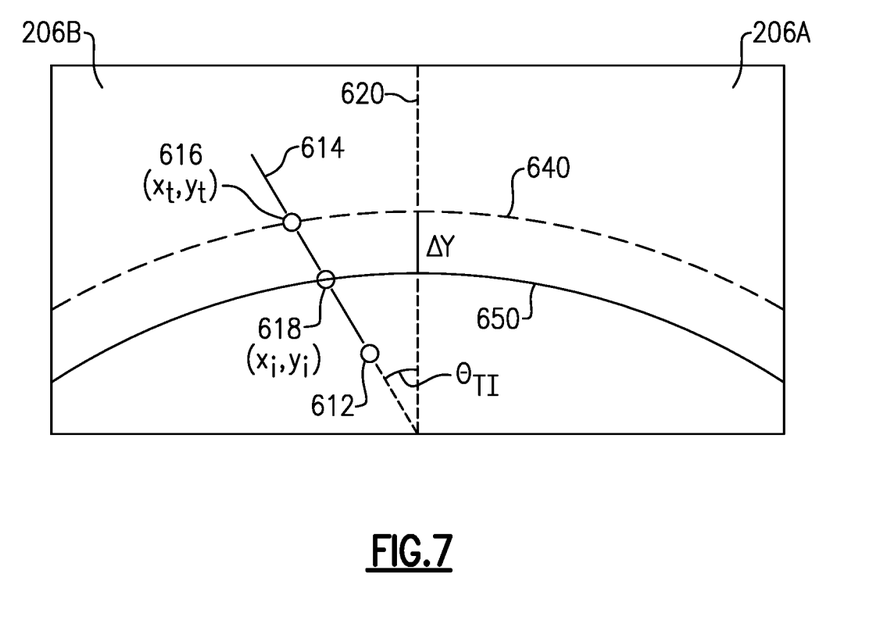
FIG. 7 diagrammatically illustrates an example technique for determining an HMI adjustment.

FIG. 7 illustrates two annotated CMS images 206A-B that will be used to discuss the implementation 450 of step 406. The images 206A-B are presented adjacent to each other in FIG. 7 for explanatory purposes (even though in actuality they would likely be provided on separate CMS displays 18A, 18B). Image 206A represents a CMS image from camera 20A, and image 206B represents a CMS image from camera 20B. Point 612 represents a calibration point of the commercial vehicle (e.g., a front lower corner of the trailer 14), point 616 having coordinates $(x_t, y_t)$ represents a rear corner of the trailer (first reference point from step 406) (e.g., trailer lower rear corner 160A), and point 618 having coordinates $(x_i, y_i)$ represents a third reference point of the commercial vehicle 10 (e.g., a wheel center 150A, 150B, or 150C of FIG. 4).

Arc 650 represents a trajectory/range of possible values of the third reference point in the images (e.g., a range of possible values of one of the wheel centers 150), and arc 640 represents a trajectory range of possible values of the first reference point in CMS images (e.g., a range of possible values of the lower rear trailer corner 160A). The labeled distance $\Delta Y$ represents a vertical distance between the arcs 640, 650. A trailer reference line 614 extends through the first reference point 616, second reference point 612, and third reference point 618, and denotes a direction of the trailer 14 with respect to the tractor 12. A trailer image angle $\theta_{T1}$ represents an angle defined relative to the trailer line 614 (which in the example of FIG. 7 is defined relative to image edge 620

Referring again to FIG. 6, a location of a trailer calibration point (e.g., second reference point 612) is determined in step 452. This step may be performed using conventional image analysis, for example. The trailer calibration point is a trailer position that the trailer reference line 614 is drawn relative to. In one example, the calibration point 612 remains generally constant throughout a vehicle operation and can be detected using trailer markings and/or marking independent image analysis.

The trailer angle $\theta_T$ is determined between tractor longitudinal axes L1 and trailer longitudinal axis L2 (see FIG. 1C) (step 454). The trailer angle $\theta_T$ may be a detected trailer angle from a trailer angle sensor (not shown), a derived trailer angle determined from image analysis, synthesized data from multiple vehicle sensors, or any combination thereof. In the context of the implementation 450, the trailer angle $\theta_T$ represents a three-dimensional angle, while the trailer image angle $\theta_{T1}$ represents a two-dimensional angle.

The trailer image angle $\theta_{T1}$ is determined based on the trailer angle $\theta_T$ (e.g., using a lookup table) (step 456). Third reference point 618 corresponds to an intersection of the trailer reference line 614 and the arc 650 is determined (step 458). The first reference location of the first reference point 616 is determined based on the intersection of the trailer reference line 614 and the arc 650, and the distance ΔY (pixel deviation) between the arcs 640, 650 (step 460).

Thus, step 406 may be performed based on at least the trailer angle $\theta_T$, and the arc 640, which represents a predefined range of possible locations of the first reference point in the images.

Also, performance of step 406 may include determining the trailer image angle $\theta_{T1}$ based on the trailer angle $\theta_T$, and determining the reference location of the first reference point based on an intersection of the trailer reference line 614 and the arc 650, and a distance between the arcs 640, 650.

The process described and illustrated in FIGS. 6 and 7 can be reiterated in order to dynamically maintain the proper positioning of the trailer end line. Further, the process of FIGS. 6 and 7 can be applied to other HMI elements and is not limited to trailer end lines.

Figure 8:
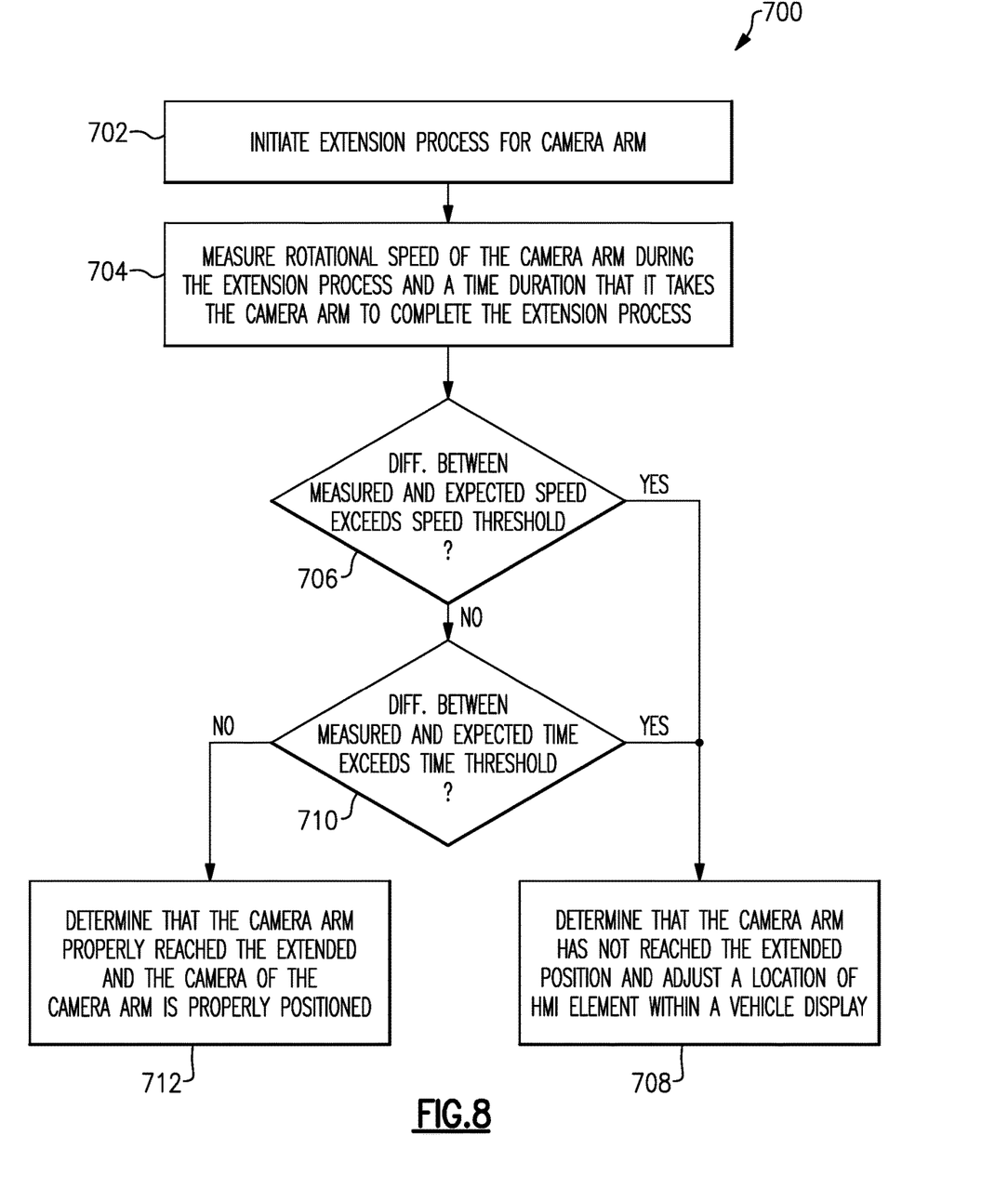
FIG. 8 schematically illustrates an example method of determining that an HMI adjustment is needed.

FIG. 8 schematically illustrates an example method 800 of determining that an HMI location adjustment is needed. As discussed above, the camera arm 16 extension process extends the camera arm from a retracted position (see, e.g., FIG. 3A) to an extended position (see, e.g., FIG. 3B). During normal operation, the extension is performed at a predefined rotational speed and takes a predefined time duration to complete. If the extension process is performed at an irregular speed or lasts for an irregular time duration, that can be interpreted as an indication that the camera arm 16 is obstructed by an external object (e.g., a tree branch) or that the camera arm 16 is damaged (e.g., from contact with the external object), and thereby the camera 20 of the camera arm 16 is not properly positioned (e.g., properly located and oriented).

Referring to FIG. 8, the camera arm extension process is initiated (step 702). A rotational speed of the camera arm 16 during the extension process is measured using angular motion sensor 26 of the camera arm 16, and a time duration that it takes the camera arm 16 to complete the extension process is also measured (step 704). The measured rotational speed is compared to the expected, predefined rotational speed, and a determination is made of whether a difference between the measured and expected rotational speed exceeds a speed threshold (step 706).

If the difference exceeds the threshold (a "yes" to step 706), a determination is made that the camera arm 16 has not reached the extended position, and a location of a HMI element within a vehicle display 18 is adjusted (step 708). Step 708 also represents a determination that the first reference point of step 406 of method 400 has changed. If the difference does not exceed the threshold (a "no" to step 706), then the method proceeds to step 710.

In step 710, the measured time duration is compared to the expected, predefined time duration, and a determination is made of whether a difference between the measured and expected time durations exceeds a time duration threshold (step 7010). If the difference exceeds the time duration threshold (a "yes" to step 710), the method proceeds to step 708. Otherwise, if the difference does not exceed the time duration threshold (a "no" to step 710), a determination is made that the camera arm 16 properly reached the extended position, and correspondingly that the camera 20 is properly located oriented.

Although measurement and comparison of both the rotational speed and time duration are discussed in steps 704, 706, and 710, it is understood that the rotational speed measurement and comparison may be omitted, such that the determination of step 708 is based on time duration and not rotational speed, or the time duration measurement and comparison may be omitted, such that the determination in step 708 is based on rotational speed but not time duration.

The features described above describe how an HMI element can be automatically positioned and repositioned based a variety of factors that cause relative movement of a trailer reference point in a CMS image (e.g., vehicle turning, vehicle locating, road grade changes, and/or an irregular camera arm extension).

Although an example embodiment has been disclosed, a worker of ordinary skill in this art would recognize that certain modifications would come within the scope of the claims. For that reason, the following claims should be studied to determine their true scope and content.

What is claimed is:

1. A method for adjusting a human machine interface (HMI) element location in a commercial vehicle display, comprising:
    displaying, on an electronic display of a commercial vehicle, images from a camera secured to the commercial vehicle that depict a trailer of the commercial vehicle and its surrounding environment;
    determining a reference location of a reference point of the trailer in the images;
    superimposing an HMI element in the images on the electronic display at an HMI location determined relative to the reference location; and
    detecting that the reference location has changed in the images, and adjusting the HMI location in response thereto;
    wherein said determining reference location of the reference point of the trailer is based on;
        a first trailer angle, which is an angle between a longitudinal axis of the trailer and a longitudinal axis of a tractor connected to the trailer; and
        a first arc representing a predefined range of possible locations of the reference point in the ages; and
    wherein the reference point of the trailer is a first reference point, and said determining the reference location of the first reference point comprises:

determining, based on the trailer angle, a trailer image angle which is an angle in one of the images defined relative to a trailer reference line in the images, the trailer reference line extending from a second reference point of the commercial vehicle towards a third reference point of the trailer, wherein the second reference point is closer to a front of the trailer than the third reference point, and the third reference point is closer to the first reference point than the second reference point; and determining the reference location of the first reference point based on the trailer image angle, an intersection of the trailer reference line and a second arc representing a predefined range of possible locations of the third reference point in the images, and a distance between the first arc and the second arc in the images.

2. The method of claim 1, wherein the HMI element is a distance marker that is superimposed to extend laterally away from a side of the trailer in the images.

3. The method of claim 2, wherein said adjusting the HMI location comprises adjusting the HMI location to minimize or avoid overlap of the HMI element and the trailer in the images.

4. The method of claim 1, wherein the first reference point of the trailer is a rear corner of the trailer.

5. The method of claim 1, wherein:
the third reference point is located on a rear wheel of the trailer;
the first reference point is located proximate to a front lower corner of the trailer; and
the distance between the first arc and the second arc in the images is a vertical distance between the first arc and the second arc.

6. A camera monitoring system (CMS) for a vehicle comprising:
a camera configured to record images of a trailer of a commercial vehicle and its surrounding environment;
an electronic display; and
a CMS controller configured to:
  display the images on the electronic display;
  determine a reference location of a reference point of the trailer in the images;
  superimpose a human machine interface (HMI) element in the images on the electronic display at an HMI location determined relative to the reference location; and
  detect that the reference location has changed in the images, and adjust the HMI location of the HMI element in response thereto;
wherein the CMS controller is configured to determine the reference location of the reference point based on;
  a first trailer angle, which is an angle between a longitudinal axis of the trailer and a longitudinal axis of a tractor connected to the trailer; and
  a first arc representing a predefined range of possible locations of the reference point in the images,
wherein the reference point of the trailer is a first reference point, and to determine the reference location of the first reference point, the CMS controller is configured to;
determine, based on the trailer angle, a trailer image angle which is an angle in one of the images defined relative to a trailer reference line in the images, the trailer reference line extending from a second reference point of the commercial vehicle towards a third reference point of the trailer, wherein the second reference point is closer to a front of the trailer than the third reference point, and the third reference point is closer to the first reference point than the second reference point; and
determine the reference location of the first reference point based on the trailer image angle, an intersection of the trailer reference line and a second arc representing a predefined range of possible locations of the third reference point in the images, and a distance between the first arc and the second arc in the images.

7. The CMS of claim 6, wherein the HMI element is a distance marker that is superimposed to extend laterally away from a side of the trailer in the images.

8. The CMS of claim 7, wherein to adjust the HMI location of the HMI element on the electronic display, the CMS controller is configured to adjust the HMI location to minimize or avoid overlap of the HMI element and the trailer in the images.

9. The CMS of claim 6, wherein the first reference point of the trailer is a rear corner of the trailer.

10. The CMS of claim 6, wherein: wherein:
the third reference point is located on a rear wheel of the trailer;
the first reference point is located proximate to a front lower corner of the trailer; and
the distance between the first arc and the second arc in the images is a vertical distance between the first arc and the second arc.

* * * * *